US006611796B1

(12) United States Patent
Natarajan et al.

(10) Patent No.: US 6,611,796 B1
(45) Date of Patent: Aug. 26, 2003

(54) METHOD AND APPARATUS FOR COMBINING MEMORY BLOCKS FOR IN CIRCUIT EMULATION

(75) Inventors: Venkatesh Natarajan, Bangalore (IN); Ajit D. Gupte, Pune (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/421,979

(22) Filed: Oct. 20, 1999

(51) Int. Cl.[7] .............................................. G06F 9/455
(52) U.S. Cl. .......................... 703/28; 703/24; 711/151; 711/158; 711/170
(58) Field of Search ............................. 703/27, 24, 28; 365/230.3, 230.03; 711/121, 149–151, 167, 168, 170–172, 158

(56) References Cited

U.S. PATENT DOCUMENTS

| | | | | |
|---|---|---|---|---|
| 4,928,234 A | * | 5/1990 | Kitamura et al. ........... 711/151 |
| 4,984,213 A | * | 1/1991 | Abdoo et al. ............. 365/230.3 |
| 5,113,510 A | * | 5/1992 | Hillis ......................... 711/121 |
| 5,452,257 A | * | 9/1995 | Han ...................... 365/230.03 |
| 5,490,263 A | * | 2/1996 | Hashemi ..................... 711/149 |
| 5,826,059 A | * | 10/1998 | Harada et al. ................ 703/27 |
| 5,828,824 A | | 10/1998 | Swoboda ............... 395/183.01 |
| 6,169,700 B1 | * | 1/2001 | Luo ....................... 365/230.05 |
| 6,205,523 B1 | * | 3/2001 | Joffe et al. .................. 711/150 |
| 6,212,607 B1 | * | 4/2001 | Miller et al. ................ 711/149 |
| 6,219,763 B1 | * | 4/2001 | Lentz et al. ................. 711/151 |
| 6,233,195 B1 | * | 5/2001 | Yamazaki et al. ...... 365/230.03 |
| 6,304,958 B1 | * | 10/2001 | Kiuchi et al. ............... 712/229 |
| 6,334,175 B1 | * | 12/2001 | Chih .......................... 711/170 |
| 6,480,927 B1 | * | 11/2002 | Bauman ..................... 710/317 |

FOREIGN PATENT DOCUMENTS

WO    WO 96/24900    *  8/1996    ........... G06F/12/14

OTHER PUBLICATIONS

XDS512RL/Tek™ *Emulation System Getting Started Guide*, Texas Instruments Incorporated, Lit. No. SPRU256A, Apr. 1998.
*Reconfigurable Datapath for Processor Debug Functions*, (TI–27296), Filed Sep. 17, 1998 as Provisional Application No. 60/100,712 and converted Aug. 24, 1999 to Non–Provisional Application Ser. No. 09/379,769.

\* cited by examiner

Primary Examiner—Kevin J. Teska
Assistant Examiner—Kandasamy Thangavelu
(74) Attorney, Agent, or Firm—Gerald E. Laws; W. James Brady, III; Frederick J. Telecky, Jr.

(57) ABSTRACT

An emulation device is provided that has a processor core that is a programmable digital signal processor (DSP). Several blocks of memory within the emulation device can be configured to emulate blocks of memory on a target processor system. Each block of memory responds to three different memory buses and can receive up the three simultaneous memory requests. Arbitration circuitry selects the highest priority memory request for service on each cycle. Each memory block is configured to respond to a block of addresses beginning at a selected starting address. Two blocks of memory can be linked to form a single merged block of memory in which both arbitration circuits operate in lock step by masking a most significant address bit of the block of address selected for the memory block.

8 Claims, 7 Drawing Sheets

METHOD AND APPARATUS FOR COMBINING MEMORY BLOCKS FOR IN CIRCUIT EMULATION

FIELD OF THE INVENTION

The present invention relates to digital microprocessors, and more particularly to monitoring the operation and performance of digital microprocessors.

BACKGROUND OF THE INVENTION

Microprocessors are general purpose processors which require high instruction throughputs in order to execute software running thereon, and can have a wide range of processing requirements depending on the particular software applications involved. Microprocessors are now combined with memory circuits and other peripheral circuits into a single integrated circuit and may be custom designed for a particular target system. Often, access to a microprocessor in a target system for software development and debugging is difficult.

Known microprocessor debugging environments provide a means for gaining access to a microprocessor in a target system, of which In Circuit Emulation (ICE) is a commonly favored technique. Typically, a processor in the target system is temporarily replaced by an emulation module that provides connectivity to a test system for monitoring and modifying target system software that is executed by the emulation module.

Alternatively, the target processor is connected to the test system via a test access port, such a JTAG, and the target processor executes the target system software while exchanging test information with the test system via the test access port. JTAG is defined in IEEE 1149.1-1990 "Standard Test Access Port and Boundary Scan Architecture. Terms and concepts relating to IEEE 1149.1 which are used herein, are explained fully in this IEEE standard. The IEEE 1149.1 standard provides a communication protocol that allows the selection of one or more devices imbedded within a system. This protocol implements the primitives necessary to control on-chip debug and test facilities.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in, but not exclusively, applications such as disk controllers for portable computers and mobile telecommunications, it is desirable to provide ever increasing DSP performance while keeping power consumption as low as possible.

SUMMARY OF THE INVENTION

A method and apparatus has now been discovered for emulating a block of memory in a target system with two or more blocks of memory that operate in lock step. Particular and preferred aspects of the invention are set out in the accompanying independent and dependent claims.

In accordance with a first aspect of the invention, there is provided a digital system that has a memory block. The memory block has an address bus for receiving an address, the address decoding circuitry is connected to the address bus. The address decoding circuitry is operable to detect if a received address is within a preselected address block. Bank decode circuitry is connected to the address bus and is operable to detect if a received address is within a preselected address bank. Memory circuitry is connected to the address bus and is operable to transfer data on a data bus in response to a received address if the received address is within the preselected bank and the preselected address block. Control circuitry is connected to the address decoding circuitry. The address decoding circuitry is operable to selectively mask a relative most significant address (msb) bit of the received address corresponding to a size of the memory block in response to the control circuitry. Thus, a plurality of linked memory blocks are operable to selectively detect an address being in the same preselected address block but only one of the plurality of memory blocks is operable to transfer data in response to the bank decode circuitry.

In accordance with another aspect of the present invention, a method for emulating a block of memory in a target system is provided. A first replacement memory block having a first capacity is configured to emulate a first block of target memory in a first target system, wherein the first target memory has a capacity less than or equal to the first capacity. For a second target system, the first replacement memory block is reconfigured to link to a second replacement memory block to emulate a second block of target memory by masking a relative most significant bit (msb) of a memory request address received by the first replacement memory block and by the second replacement memory block. The linked first replacement memory and second replacement memory have a combined second capacity, wherein the second target memory has a capacity larger than the first capacity but less than or equal to the combined second capacity.

BRIEF DESCRIPTION OF THE DRAWINGS

Particular embodiments in accordance with the invention will now be described, by way of example only, and with reference to the accompanying drawings in which like reference signs are used to denote like parts and in which the figures relate to the emulation device of FIG. 1, unless otherwise stated, and in which.

DESCRIPTION OF THE PARTICULAR EMBODIMENTS

Although the invention finds particular application to Digital Signal Processors (DSPs), implemented, for example, in an Application Specific Integrated Circuit (ASIC), it also finds application to other forms of processors.

Figure 1:
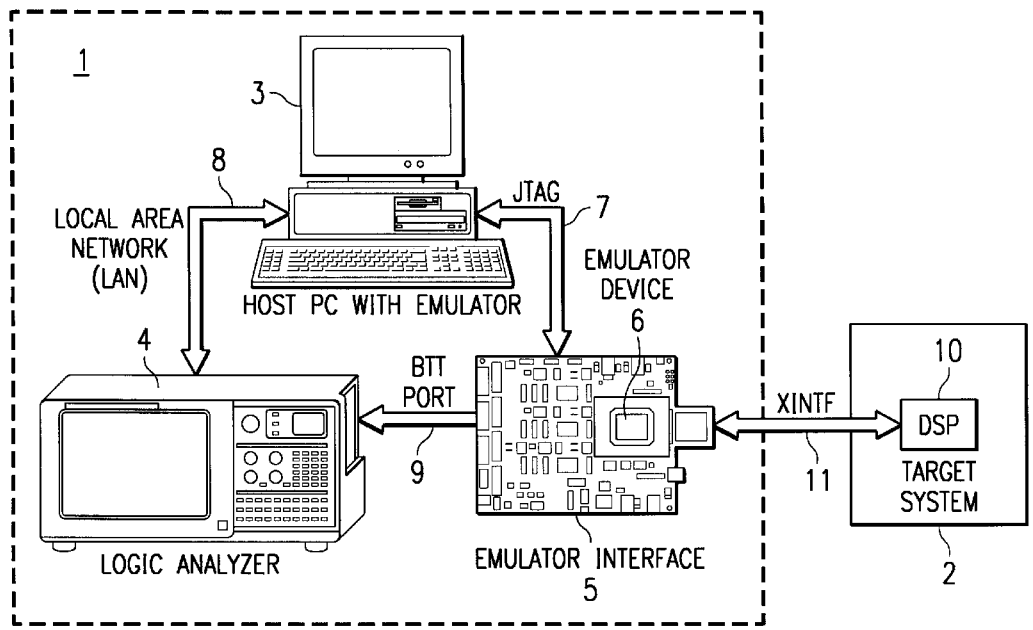
FIG. 1 is a block diagram illustrating a test system for emulation of a DSP in a target system, according to aspects of the present invention.

FIG. 1 is a block diagram illustrating a test system 1 for emulation of a DSP 10 in a target system 2, according to aspects of the present invention. U.S. Pat. No. 5,329,471 issued to Gary Swoboda, et al, describes in detail how to test and emulate a DSP and is incorporated herein by reference. Host PC 3 contains emulation software and an emulation control card, such as an XDS510, available from Texas Instruments Incorporated. Emulator interface board 5 is connected to the emulation control card in host PC 3 via a JTAG interconnection 7. Emulator interface board 5 is an XDS512 available from Texas Instruments Incorporated, for example. Logic analyzer 4 is connected to host PC 3 via local area net (LAN) 8 and to emulator interface board 5 via breakpoint, tracing and timing (BTT) interface 9. BTT port 9 provides information about executed instructions and the memory accesses they perform. This information can be captured by the logic analyzer 4, which allows a test system user to selectively trace program execution under control of host PC 3. Logic analyzer 4 is a TLA704, available from Tektronix, for example. Emulator interface board 5 is fitted with an emulation device 6, which will be described in more detail in the following sections. Emulator interface board 5 provides an interface to allow trace data to be transferred from emulation device 6 to logic analyzer 4 via BTT port 9. Emulator interface board 5 also provides an interface to connect emulation device 6 to JTAG cable 7. Emulation device 6 is connected to DSP 10 in the target system via external interface 11. Target system 10 includes a hard drive disk that is controlled by DSP 10, for example.

Figure 2:
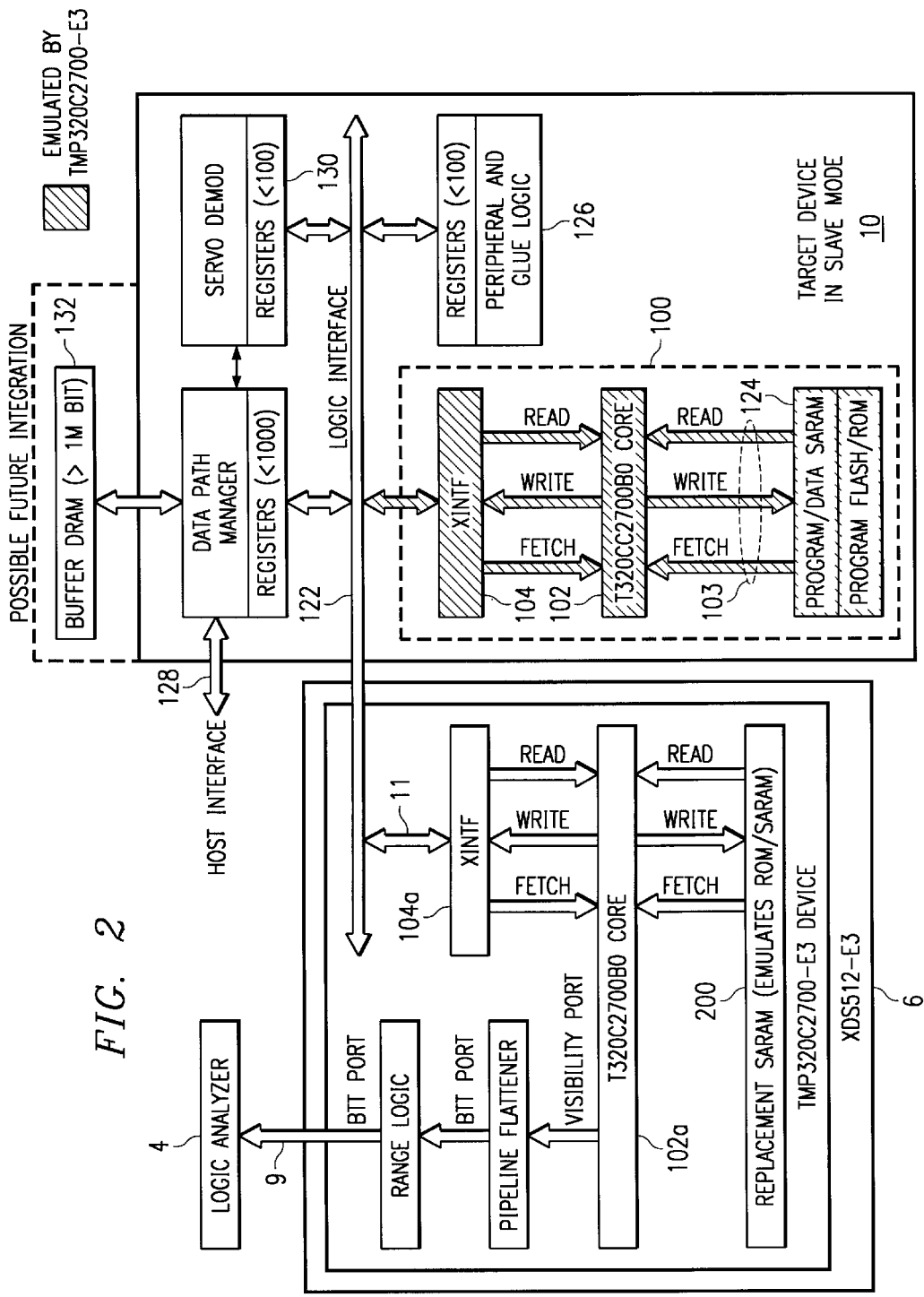
FIG. 2 is a more detailed block diagram of the target device and emulation device of FIG. 1.

FIG. 2 is a more detailed block diagram of target device 10 and emulation device 6. Target digital system 10 includes a processor 100. In a particular example, digital system 10 is implemented in an Application Specific Integrated Circuit (ASIC). In the interest of clarity, FIG. 2 only shows those portions of microprocessor 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. Details of portions of microprocessor 100 relevant to an embodiment of the present invention are explained in sufficient detail herein below, so as to enable one of ordinary skill in the microprocessor art to make and use the invention.

The basic architecture of an example of a processor will now be described. Processor 100 of FIG. 2 is a programmable fixed point DSP core offering both high code density and easy programming. Architecture and instruction set are optimized for low power consumption and high efficiency execution of DSP algorithms as well as pure control tasks, such as for hard disk drive controllers, for example. Processor 100 includes emulation and code debugging facilities. As shown in FIG. 2, processor 100 has a central processing unit (CPU) with a processor core 102 and program/data memory 124 interconnected via buses 103. A memory interface unit 104 interfaces processor core 102 with memory units external to processor core 102, such as buffer RAM 132. A backplane bus 122 connects to peripheral devices 126 and 130 and an external interface 128. Servo demodulation circuitry 130 connects to the hard drive in the target system and provides control and data recovery, in conjunction with DSP 100. It will be appreciated that in other examples, target device 10 could be implemented using different configurations and/or different technologies.

In this embodiment, processor core 102 is a customizable DSP (cDSP) that can be easily combined with custom designed circuitry, other digital hardware macros, and linear hardware macros. An ASIC design environment with a macro cell library allows logic designers to reduce part or all of a system design to a single integrated circuit to improve performance and reliability while reducing system cost, hardware size, and power consumption. In the present embodiment, processor core 102 is a T320C2700B0 core, available from Texas Instruments Incorporated. However, one skilled in the art will realize that aspects of the present invention are readily applicable to emulation of other types of microprocessors.

According to an aspect of the present invention, emulation device 6 is used to replace processor 100 so that better visibility is provided to test system 1. As such, an identical processor core 102a and replacement memory 200 are connected to backplane bus 122 via external interface 11 in such a manner that target core 102 and memory 124 are idled. Since target system 10 is a customizable ASIC, emulation device 6 must be able to correctly emulate a variety of memory configurations that can exist in memory system 124, including RAM and ROM.

Figure 3:
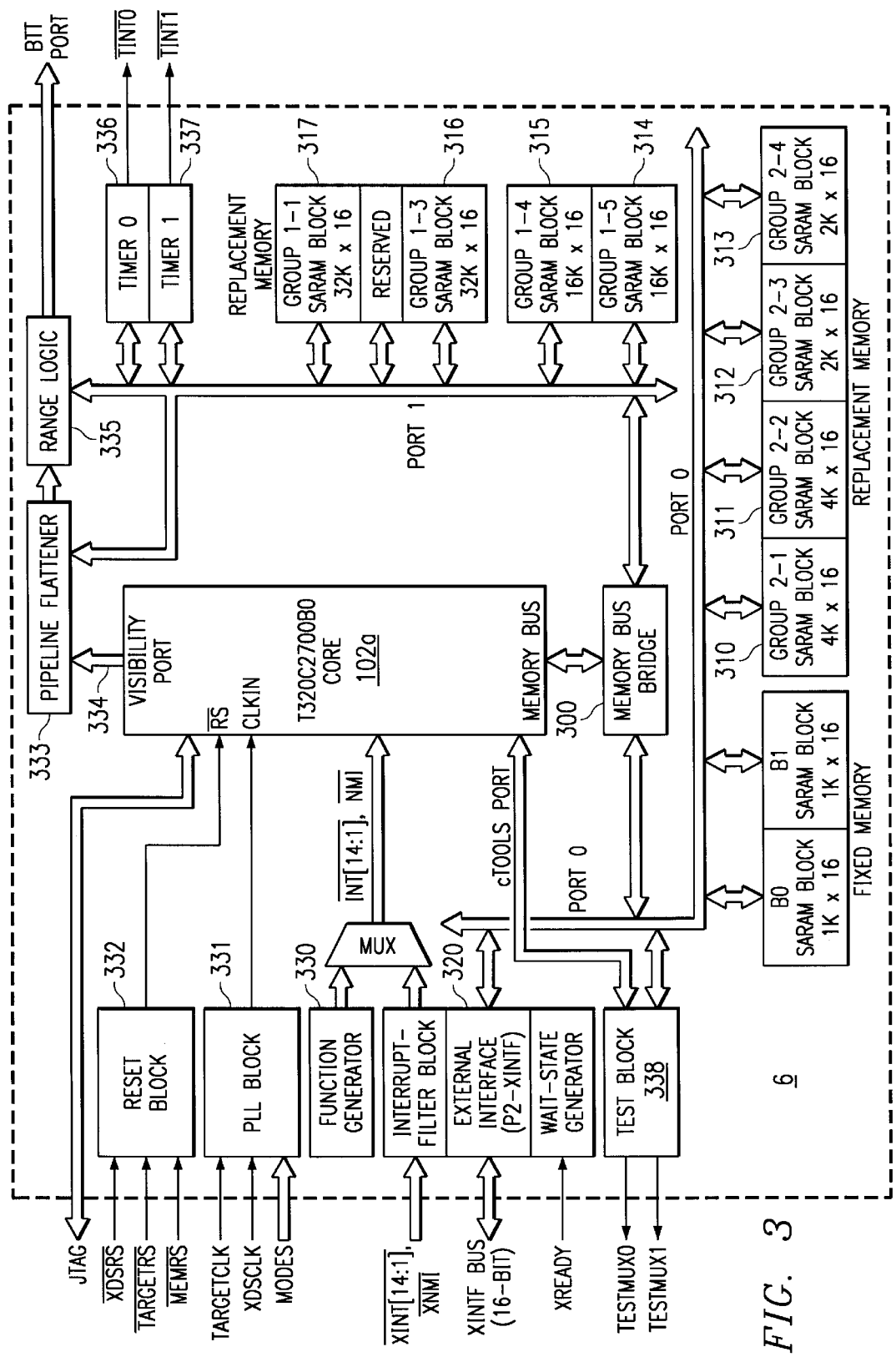
FIG. 3 is a block diagram illustrating the emulation device in more detail.

FIG. 3 is a block diagram illustrating emulation device 6 in more detail. CPU core 102a will be described in more detail with respect to FIG. 4. A memory bus bridge 300 external to, but located close to the core, supports two copies of the memory bus, Port 0 and Port 1. To accommodate memory configurations of various target systems, emulation device 6 contains memory blocks 310–317 that can be mapped to any non-overlapping binary boundary memory location within the addressable space of the core. The replacement memory blocks are segmented into two groups, group 1 being blocks 314–317 and group 2 being blocks 310–313. Within each group, two blocks of the same size can be linked to form a larger memory block, according to an aspect of the present invention. For each block, configuration registers enable the user to program the location of the blocks via the JTAG port or via the user application software. A separate reset line (MEMRS) exists for these configuration registers such that during normal reset operations, the programmed memory locations of the blocks are not corrupted. The memory blocks can also be configured to emulate ROM and single-access RAM (SARAM), and read operations from flash memory. The total replacement memory size is 108K words by 16 bits (excluding fixed memory blocks B0 and B1). Group 1 blocks are connected to Port 1 and Group 2 blocks to Port 0.

Each replacement memory block can respond to a program space read or write request and a data space read or write request. Separate wait state request signals are generated by each memory block for each type of request in response to arbitration circuitry within each memory block, which will be described in more detail with respect to FIGS. 10–12. All of the wait state signals of each type from all of the blocks of memory are ANDed together and provided to pipeline control circuitry within the CPU core to cause the pipeline to stall if a memory block requests a wait state.

Emulation device 6 also contains two single access random-access memory (SARAM) blocks, called B0 and B1, which are 1K words in size. Block B1 can also be configured to emulate mirroring for target devices that use smaller blocks. B0 and B1 are connected to Port 0.

External interface (XINTF) 320 is the connection to target systems. This asynchronous interface consists of 22 address lines and 16 data lines. It supports connection to 8-bit or 16-bit memories/peripherals, and supports 8-bit, 16-bit, and 32-bit data transfers. Each of the eight zones in the XINTF can be mapped to any non-overlapping binary boundary within the addressable space and supports emulation of microprocessor/microcomputer mode (for ROM emulation). The XINTF can also be programmed with different numbers of wait states for specified memory zones. Configuration and control registers, accessible via the JTAG port or the user application code, configure the modes of operation. The external interrupt lines can also be programmed for level or edge detection, and synchronization logic can be disabled.

Function generator 330 is included in the emulation device for use in silicon test and debug efforts. It is used to generate various interrupt waveforms to assist in the debug of interrupt events.

PLL block 331 enables the user to program (via external jumpers) various fixed frequency multiples and modes. It can source the external clock from the emulation system (XDSCLK) or from the target system (TARGETCLK). The PLL block can also be disabled and either of the external clocks fed directly to the core.

Reset block 332 filters and distributes the various system resets necessary for the emulation device. The $\overline{\text{XDSRS}}$ and $\overline{\text{TARGETRS}}$ signals reset the core and any peripheral operating mode configuration registers. The $\overline{\text{MEMRS}}$ signal resets any memory or peripheral mapping registers. The mapping of any memory or peripheral is not affected by the $\overline{\text{XDSRS}}$ and $\overline{\text{TARGETRS}}$ signals. The reset block also synchronizes the various asynchronous reset inputs to the device clock.

Pipeline flattener 333 aligns the instruction decode, read and write phases of the pipe such that the information for each instruction is "flattened" for ease of tracing by an external logic analyzer. This block attaches to a visibility port 334 and Port 1 of the memory bus of the CPU.

Range logic 335 is used to provide some additional triggering capability for external logic analyzer tracing.

Timer 0 336 and timer 1 337 are identical 16-bit timers with presettable periods and with clock prescaling. The timers have a 16-bit count-down register that generates an interrupt and sets/toggles an output pin when the counter reaches 0. The counter is then automatically reloaded with the period value. The timer configuration registers can be remapped anywhere in the target processor core address map, this allows the emulation device to substitute any target device timers with similar functionality.

Test block 338 contains two multiplexers that enable probing certain internal emulation device signals that are not pinned out.

All peripherals and memories attached to the memory bus ports prioritize memory accesses. Generally, the priority of memory bus accesses can be summarized as shown in Table 1.

TABLE 1

Priority of Memory Bus Accesses

| Highest: | Data Writes (see Note 1) |
| --- | --- |
|  | Program Writes (see Note 1) |
|  | Data Reads |
|  | Program Reads (see Note 2) |
| Lowest: | Instruction Fetches (see Note 2) |

NOTES:
1. Simultaneous data and program writes cannot occur on the memory bus.
2. Simultaneous program reads and fetches cannot occur on the memory bus.

Figure 4:
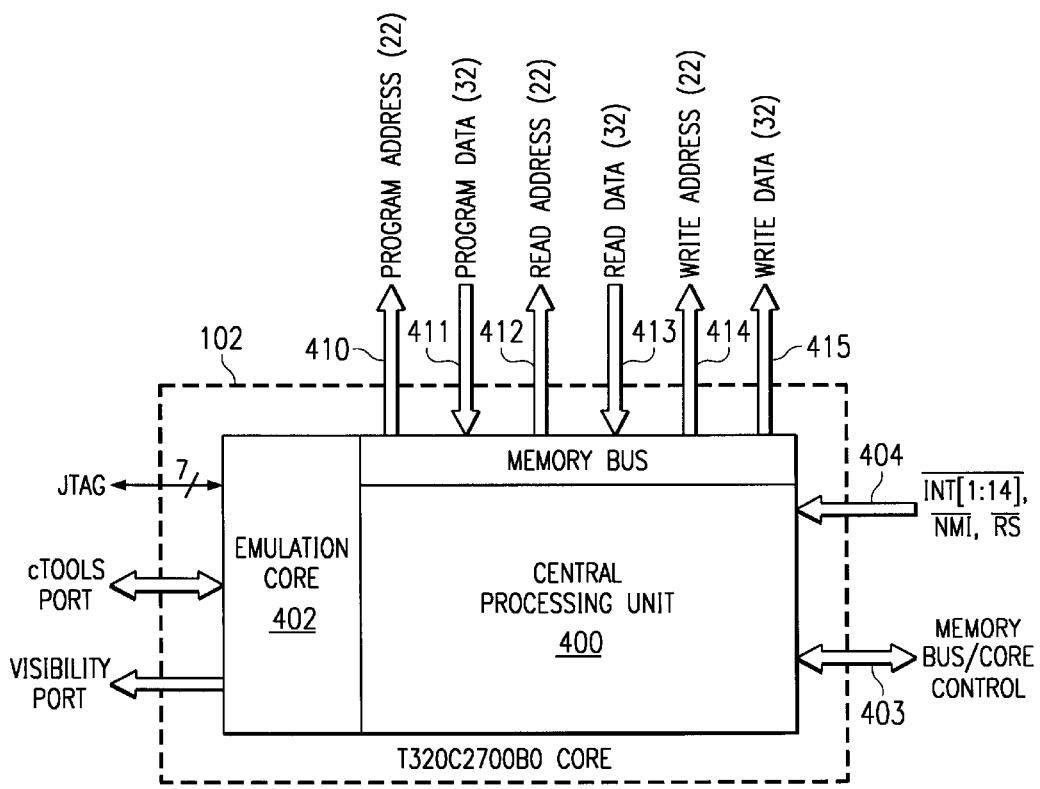
FIG. 4 is a more detailed block diagram of the DSP core within the target processor of FIG. 2.

FIG. 4 is a more detailed block diagram of DSP core 102 and 102a. The core consists of a central processing unit (CPU) 400, emulation logic 402, and memory control signals 403 and interrupt signals 404 for interfacing with memory and peripherals. It also includes six interface buses 410–415: three 22-bit address buses and three 32-bit data buses. The core is implemented in a modified Harvard architecture, which uses multiple memory spaces to enable instruction and data fetches to be performed in parallel, allowing single-cycle instructions. The CPU can read instructions and data while it writes data simultaneously to maintain the single-cycle instruction operation across the pipeline. The CPU does this over the six separate address/data buses.

Figure 5:
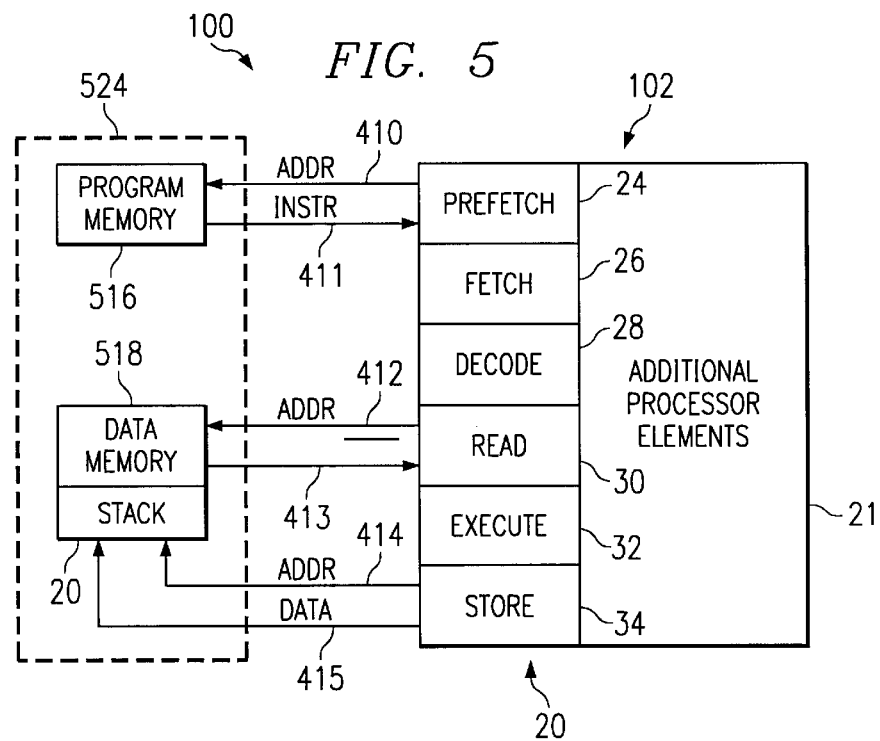
FIG. 5 is a more detailed block diagram of the target processor of FIG. 2, illustrating an instruction execution pipeline and memory system.

FIG. 5 is a more detailed block diagram of processor 100, showing core 102 and memory system 524. Memory system 524 includes both a program memory 516 and a data memory 518.

Processor 100 includes a pipeline 20. Pipeline 20 includes a prefetch stage 24, a fetch stage 26, a decode stage 28, a read stage 30, an execute stage 32, and a store stage 34. Processor 100 may also include additional processing elements 21.

Prefetch stage 24 obtains an instruction from a memory location in program memory 516. Prefetch stage 24 issues a memory address to program memory 516, and an instruction stored in the location in program memory 516 that corresponds to that address is provided to prefetch stage 24. An address is provided by prefetch stage 24 to program memory 516 on instruction address bus 36. An instruction is returned to prefetch unit 24 from program memory 516 on instruction bus 38. Prefetch stage 24 includes a program counter 58 that generates an address corresponding to an instruction stored in program memory 616. Prefetch stage 24 may be replaced with more than one pipeline stage. For example, prefetch stage 24 may be replaced with a separate stage that performs the function of computing an address of the memory location in program memory 516 from which to read an instruction and a separate stage that performs the function of reading the instruction from the specified address. However, as used hereinafter, "prefetch stage" refers to the stage in a pipeline that actually calculates an address from which an instruction is to be obtained.

Decode stage 28 decodes the instruction obtained from program memory 516. Read stage 30 reads from data memory 518 any data necessary for execution of the instruction decoded by decode stage 28. Decode stage 28 and Read stage 30 may each be replaced with more than one stage. For example, Decode stage 28 may have a first stage that performs a gross decode to determine a class of instructions, for example, and a second stage that does a fine decode of the various instruction fields, for example. Likewise, read stage 30 may be replaced by a separate stage that performs a computation necessary to determine from which location in data memory 518 data will be read, and a separate stage that performs the function of reading such data. Execute stage 32 performs the function of executing the instruction decoded by decode stage 28. Although execute stage 32 may be divided into a plurality of stages, as used hereinafter, "execute stage" refers to a stage in a pipeline that performs at least the function of determining if a condition associated with a conditional call is met. Store stage 34 performs the function of writing any data that may be required to be written as a result of the execution of instruction 38.

Store stage 34 performs the function of writing any data that may be required to be written after execution of instruction, such as a result.

For simplicity, only single stages for each of the categories discussed above will be shown in the following timing diagrams, however one skilled in the art can readily apply the teachings herein to instruction execution pipelines that have fewer or more stages.

Referring again to FIG. 3, emulation device 6 provides a large amount of on-chip RAM to allow for code development. Memory consists of blocks that can be reconfigured into varying sizes. Each block can be assigned different starting addresses for both program address space and data space with different attributes. For example, a block can be configured as read-only memory or it can be configured to imitate the timing of different types of memory. Two blocks of the same size can be combined to form a larger block. A memory block can support only one memory access at a time, but is connected to all three address buses 410, 412, 414 and can receive up to three simultaneous memory requests. Simultaneous accesses to a block or to a grouped block can introduce memory stalls.

This embodiment of emulation device 6 supports up to 108K by 16 words of replacement memory, excluding blocks B0 and B1. Memory blocks B0 and B1 are used for basic operation of the processor core and for testing; they are therefore isolated from the other memory blocks. The replacement memory blocks can be mapped to program space, data space, or both. They also can be mapped to different address boundaries in either program or data space. The memory blocks available in the present embodiment include: two blocks 316/317 of 32K words by 16 bits; two blocks 314/315 of 16K words by 16 bits; two blocks 310/311 of 4K words by 16 bits; and two blocks 312/313 of 2K words by 16 bits. One skilled in the art will realize that in another embodiment the memory block sizes may be freely changed and still embody aspects of the present invention.

Figure 6:
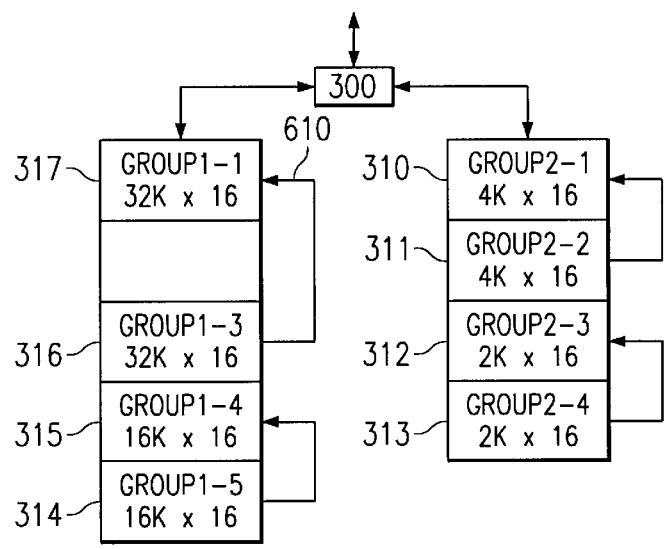
FIG. 6 is a block diagram illustrating how pairs of memory blocks in the emulation device can be linked to emulate larger blocks of memory, according to an aspect of the present invention.

FIG. 6 is a block diagram illustrating how pairs of memory blocks can be linked to emulate larger blocks of memory, according to an aspect of the present invention. For example, 32 k-word memory block 316 can be merged with 32 k-word memory block 317, as indicated by link 610, to form a 64 k-word merged memory block. The memory blocks can be mapped only to binary boundaries, which are equal to the total block size. For example, a 16K block can be mapped only at every 16K boundary. If two blocks are merged, for example, if 4K block 310 is merged with another 4K block to form an 8K block, the combined block size must be mapped on an 8K binary boundary. One skilled in the art will realize that in another embodiment of the present invention, various mapping techniques can be included in each memory block so that different boundary conditions exists, or even so that no boundary conditions exist.

Figure 7:
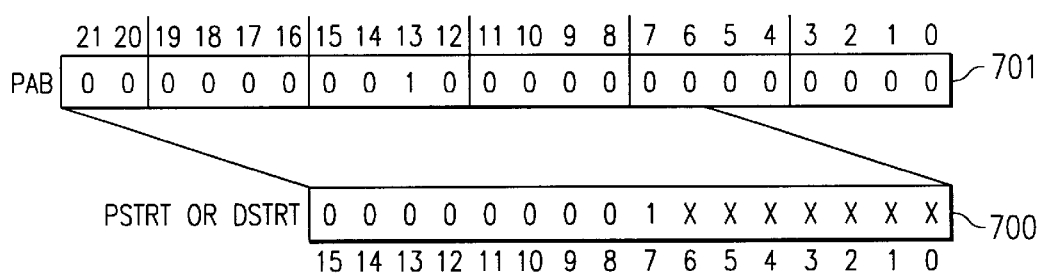
FIG. 7 illustrates a representative start address register, two of which are contained within each replacement memory block in the emulation device.

FIG. 7 illustrates a representative start address register 700. Each memory block contains two start address registers; one for program space and one for data space. Table 2 shows the bit definitions for a program start address register, referred to as PSTRT. Since the present embodiment of emulation device 6 has eight memory blocks, there are eight PSTRT registers and each one uses this same format.

TABLE 2

Program Start Address Register Bit Definitions

| NO. | FUNCTION |
|---|---|
| 15-n | PSTRT[15:n]. Maps the memory block to a location in program space. The higher bits of the program address bus, PAB[21:m] (m = 10–14) are compared with the PSTRT[15:n] (n = 4–8) bits to determine whether the memory is selected. The number of bits compared depends on the size of the memory block, as shown in Table 5. |

Table 3 lists the address bit comparison that is used for the various sizes of memory. In the present embodiment, each memory block is constrained to start at a defined binary block location so that at most ten address bits are required to define the starting address of the memory block. To calculate the value to load in a PSTRT register, the desired starting address must be aligned to the appropriate boundary, and that address is divided by 64. For example, a 4K block on an 8K boundary can arbitrarily be placed at address 2000h, as indicated in FIG. 7 on program address bus 701. Dividing by 64 or right shifting by 6 obtains a value of 0080h for the register, as illustrated in FIG. 7 where a value of 0080h is stored in PSTRT register 700.

TABLE 3

PSTRT Bit Comparison

| BLOCK SIZE | BOUNDARY | COMPARISON BETWEEN | |
|---|---|---|---|
| 1K × 32 | 2K | PAB[21:11] | PSTRT[15:5] |
| 2K × 32 | 4K | PAB[21:12] | PSTRT[15:6] |
| 4K × 32 | 8K | PAB[21:13] | PSTRT[15:7] |
| 8K × 32 | 16K | PAB[21:14] | PSTRT[15:8] |
| 16K × 32 | 32K | PAB[21:15] | PSTRT[15:9] |

Table 4 shows bit definitions for a data address start register, referred to a DSTRT. All eight DSTRT registers for the replacement blocks use this same format. Similarly to PSTRT registers, to calculate the value of a DSTRT register, first determine the desired starting address, making sure it is aligned to the appropriate boundary, and divide that address by 64, as listed in Table 5.

TABLE 4

DSTRTG1_1 Register-Bit Definitions

| NO. | FUNCTION |
|---|---|
| 15-n | DSTRT[15:n]. Maps the memory block to a location in data space. The higher bits of the data-read address bus, DRAB[21:m], and the data-writeaddress bus, DWAB[21:m] (m = 10–14), are compared with the DSTRT[15:n] (n = 4–8) bits to determine whether the memory is selected. Table 7 shows the number of bits compared at different block sizes. |

TABLE 5

DSTRT Bit Comparison

| BLOCK SIZE | BOUNDARY | COMPARISON BETWEEN | |
|---|---|---|---|
| 512 × 32 | 1K | DAB[21:10] | DSTRT[15:4] |
| 1K × 32 | 2K | DAB[21:11] | DSTRT[15:5] |
| 2K × 32 | 4K | DAB[21:12] | DSTRT[15:6] |
| 4K × 32 | 8K | DAB[21:13] | DSTRT[15:7] |
| 8K × 32 | 16K | DAB[21:14] | DSTRT[15:8] |

Figure 8:
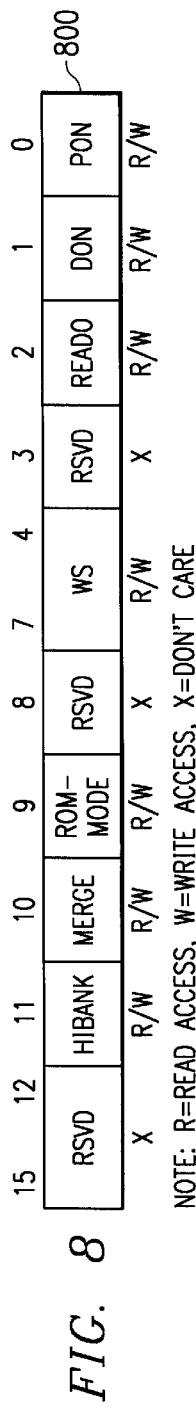
FIG. 8 illustrates a memory control register, which is contained in each replacement memory block in the emulation device.

FIG. 8 illustrates a memory control register 800, referred to as a MCTL register. Each of memory block has a MCTL register and all eight MCTL registers use this same format. Table 6 defines each bit of MCTL register 800.

TABLE 6

MCTLG1_1 Register Bit Definitions

| NO. | NAME | FUNCTION |
|---|---|---|
| 15–12 | Rsvd | Reserved |
| 11 | HIBANK | High bank enable bit. HIBANK, when set to 1, indicates that the current block is the high bank of the merged memory block. When set to 0, it indicates that the current block is the low bank of the merged memory block. If blocks are not merged, this bit must be set to 0. See default memory map for value after MEMRS. |
| 10 | MERGE | Merge memory block. This bit, when set to 1, indicates that the current block is merged with its corresponding partner. When set to 0, the block is not merged with its corresponding block (see FIG. 5). Both merged blocks must have this bit set. See default memory map for value after MEMRS. |
| 9 | ROMMODE | ROM mode enable bit. This bit, when set to 1 enables the memory block to respond to the current state of the MPNMC input signal bo the memory wrapper. If the MPNMC signal is high, the memory block is disabled from the memory map. If the MPNMC signal is low, the memory block is enabled. If the ROMMODE bit is set to 0, the current state of the MPNMC input signal is ignored. This bit applies only to Group 1 memory blocks. All other memory blocks ignore this bit. The PON and DON bit states are ignored if the block is disabled. |
| 8 | Rsvd | Reserved |
| 7–4 | WS[3:0] | Wait states. These bits indicate the number of wait states that must be introduced for any access (read or write) to this block. The number of wait states corresponds to the value of this field (i.e., 0000b = 0 wait state, 0001b = 1 wait state, 0010b = 2 wait states, etc.). WS defaults to 0 wait state on memory reset (MEMRS). 0–15 wait states are supported. |
| 3 | Rsvd | Reserved |
| 2 | READO | Read-only. If this bit is set, write accesses are ignored unless DBGACC is asserted (the TMP320C2700-E3 signal enables emulation software to download to read-only memory). READ0 defaults to zero on memory reset (MEMRS) to enable read/write mode. |
| 1 | DON | Data memory on. The block is mapped to data space when this bit is set. The value of DSTRT can be freely modified while this bit is cleared. See default memory map for value after MEMRS. See Table 9. |
| 0 | PON | Program memory on. The block is mapped to program space when this bit is set. The value of PSTRT can be freely modified while this bit is cleared. See default memory map for value after MEMRS. See Table 9. |

As discussed above, in the present embodiment of a customizable digital signal processor (cDSP) emulation device 6, memory blocks are aligned to the nearest binary boundaries. For example, a 12K SARAM block can be mapped only on every 16K boundary. Therefore, if two SARAM blocks are linked together, the combination of the two blocks must be mapped via the PSTRT/DSTRT registers to the nearest binary boundary of the combined block size. Referring again to FIG. 6, if MERGE=1 on MCTLG1_3 and MCTLG1_1, then blocks 316 and 317 are linked. If MERGE=1 on MCTLG1_4 and MCTLG1_5, then blocks 314 and 315 are linked. If MERGE=1 on MCTLG2_1 and MCTLG2_1, then blocks 310 and 311 are linked. If MERGE=1 on MCTLG2_3 and MCTLG2_4, then blocks 312 and 313 are linked.

Table 7 shows the default memory map for emulation device 6. The default memory map is set by a valid MEMRS signal. The XINTF is mapped at the top of program and data space such that it is possible to boot the emulation device from external memory.

TABLE 7

Default Memory Map

| | |
|---|---|
| 0x3FFFFF | Group1-1 Block 32K × 16 |
| | PON = 1, DON = 1, READO = 0, |
| | WS[3:0] = 0, ROMMODE = 1, |
| 0x3F8000 | MERGE = 0, HIBANK = 0 |
| | Not mapped at reset |
| 0x3F0000 | Group1-3 Block 32K × 16 |
| | PON = 1, DON = 1, READO = 0, |
| | WS[3:0] = 0, ROMMODE = 1, |
| | MERGE = 0, HIBANK = 0 |

TABLE 7-continued

Default Memory Map

| | |
|---|---|
| 0x3E8000 | Group1-4 Block 16k × 16 |
| | PON = 1, DON = 1, READO = 0, |
| | WS[3:0]= 0, ROMMODE = 1, |
| | MERGE = 0, HIBANK = 0 |
| 0x3E4000 | Group1-5 Block 16K × 16 |
| | PON = 1, DON = 1, READO = 0, |
| | WS[3:0] = 0, ROMMODE = 1, |
| 0x3E0000 | MERGE = 0, HIBANK = 0 |
| 0x004000 | Group2-1 Block 4K × 16, |
| | PON = 0, DON = 0, READO = 0, |
| 0x003000 | WS[3:0] = 0, MERGE = 1, HIBANK = 1 |
| | Group2-2 Block 4K × 16, |
| | PON = 0, DON = 0, READO = 0, |

TABLE 7-continued

Default Memory Map

| | | |
|---|---|---|
| 0x002000 | WS[3:0] = 0, MERGE = 1, HIBANK = 0, | |
| | Group2-3 Block 2K × 16, | |
| | PON = 1, DON = 1, READO = 0, | |
| | WS[3:0] = 0, MERGE = 1, HIBANK = 1 | |
| 0x001800 | Group2-4 Block 2K · 16, | |
| | PON = 1, DON = 1, READO = 0, | |
| 0x001000 | WS[3:0] = 0, MERGE = 1, HIBANK = 0 | |
| 0x000C40 | Not Used 0-Wait | Not Used 0-Wait |
| 0x000C00 | TIMER0, TIMER1 Control Registers | |
| 0x000A00 | Peripheral Register Space | |
| 0x000800 | Emulation Register Space | |
| 0x000400 | B0 Block, 1K × 16 | |
| 0x000000 | B1 Block, 1K × 16 | B0 Block, 1K × 16 |
| | Data | Program |

Figure 9:
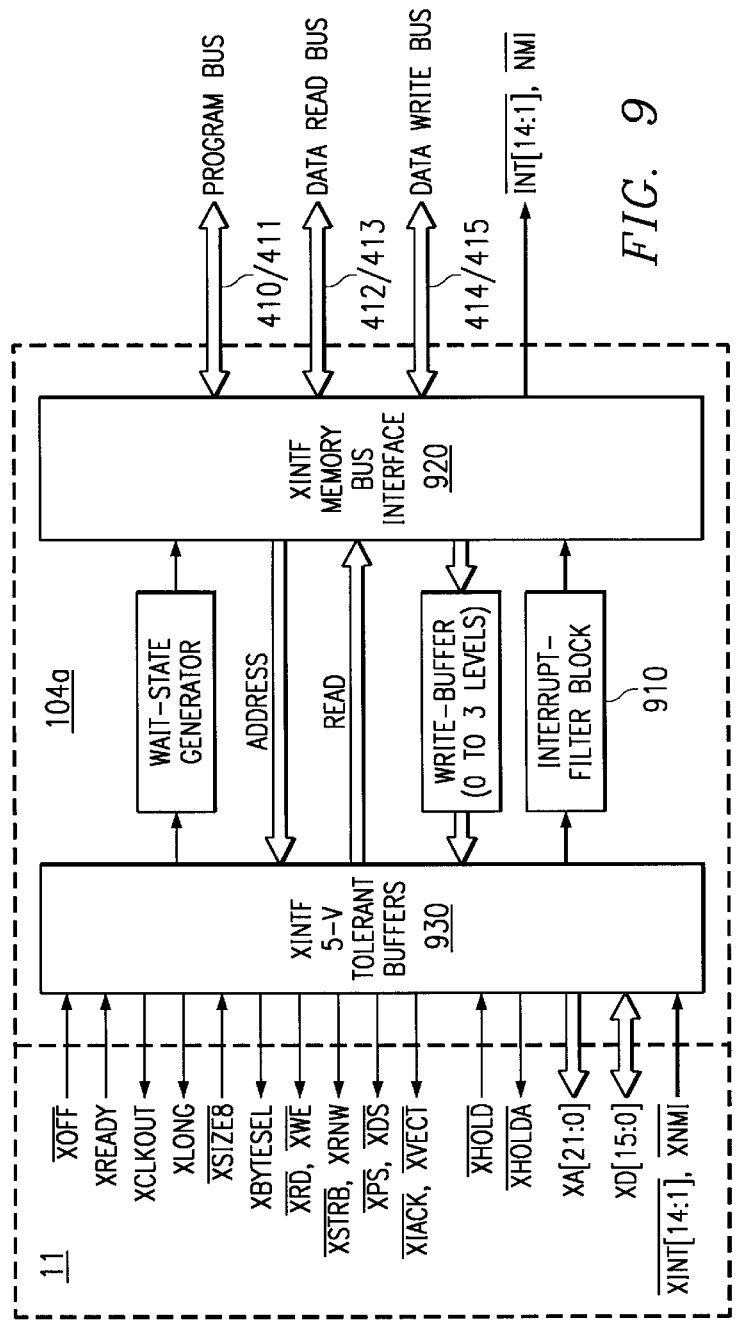
FIG. 9 is a block diagram illustrating external interface (XINTF) which connects the emulation device to the target device in more detail.

FIG. 9 is a block diagram illustrating external interface (XINTF) 104a in more detail. XINTF 104a is similar to XINTF 104 on target device 10. Referring again to FIG. 2, emulation device 6 is connected to target device 10 by connecting between XINTF 104 of target device 10 and XINTF 104a of emulation device 6 with a bus 11. Bus 11 is a cable in this embodiment which connects to a connector, not shown, provided on target system 2 and another connector, not shown, on emulator interface 5.

The XINTF bus 122 is the primary strobe-based interface for standard asynchronous memories and peripherals on target device 10. CPU core 102 does not have a dedicated bus defined for peripheral operations. Separate blocks of logic are used to interface I/O blocks to the memory buses of the core. XINTF block 104a maps the signals of the memory protocol to a smaller bus intended primarily for interfacing to off-chip components. The XINTF multiplexes the separate program, data-read, data-write buses from CPU core 102 memory buses 410–415 into a 22-bit address bus, XA[21:0], and a 16-bit data bus, XD[15:0] which forms bus 122. External bus 122 can support 32-bit, 16-bit, and 8-bit data reads and writes to external memories or peripherals. It also generates wait states for slow external memory accesses. While only 16 data lines are supported on emulation device 6, XINTF 104a performs packing/unpacking of 32-bit data. The XLONG output signal indicates that a 32-bit operation is in progress.

XINTF 104a supports program-tracing through the visibility mode. It also can support direct memory access (DMA) and cache-data transfers that share the external buses.

XINTF 104a also filters the external-interrupt signals, XINT1 to XINT14 and external non-maskable interrupt signal XNMI and forms internal interrupt signals INT1–and NMI. Each of the interrupts goes through an interrupt filter block 910, which can be configured in one of the three modes listed in Table 8. Each interrupt line can be configured independently to operate in any of the three modes.

TABLE 8

Interrupt modes

| | |
|---|---|
| Level: | not synchronized, feed the interrupt directly to the core. The interrupt input line must meet setup and hold times relative to the XCLKOUT signal and the action has no conditioning for the interrupt to be recognized. Multiple interrupts occur if the interrupt line is held low. |
| Level: | synchronize the interrupt signal to the processor clock without edge detection. The interrupt is latched two |

TABLE 8-continued

Interrupt modes

| | |
|---|---|
| | cycles after the interrupt line goes low. There are no setup and hold time requirements. Multiple interrupts occur if the interrupt line is held low. |
| Leading-edge: | synchronize the input and detect the leading edge. The leading edge is detected if the interrupt line is held high for one clock cycle and low for one clock cycle. No additional interrupts are generated if the interrupt line is held low for longer than one cycle. The XINTF bridge issues a synchronized one-processor-cycle pulse for each assertion of the interrupt. This adds clock delay but allows for an asynchronous input. |

XINTF 104a can be remapped in memory, just like the memory blocks.

Because the XINTF does not have a fixed size, both starting and ending addresses must be specified for it. XINTF bridge 920 contains several configuration registers that are read and written from the memory bus side of the bridge. The registers are used to: set up bus timing, specify how interrupts reconditioned, control write buffer depth, and specify other options. The registers should be initialized by system software during the power-up process.

XINTF 104a can be mapped into eight independent zones. Each zone has a configuration register for specifying the start address and the range (or block size). XINTF timing can be configured by zone basis in either data or program space. Each zone can also be configured to ignore the XREADY signal, allowing switching between a fast memory device with a known number of wait states and a slow device that uses the XREADY signal to increase the number of wait states.

XINTF 104a includes buffer block 930 which has 5 volt tolerant buffers for each signal on bus 11.

Figure 10:
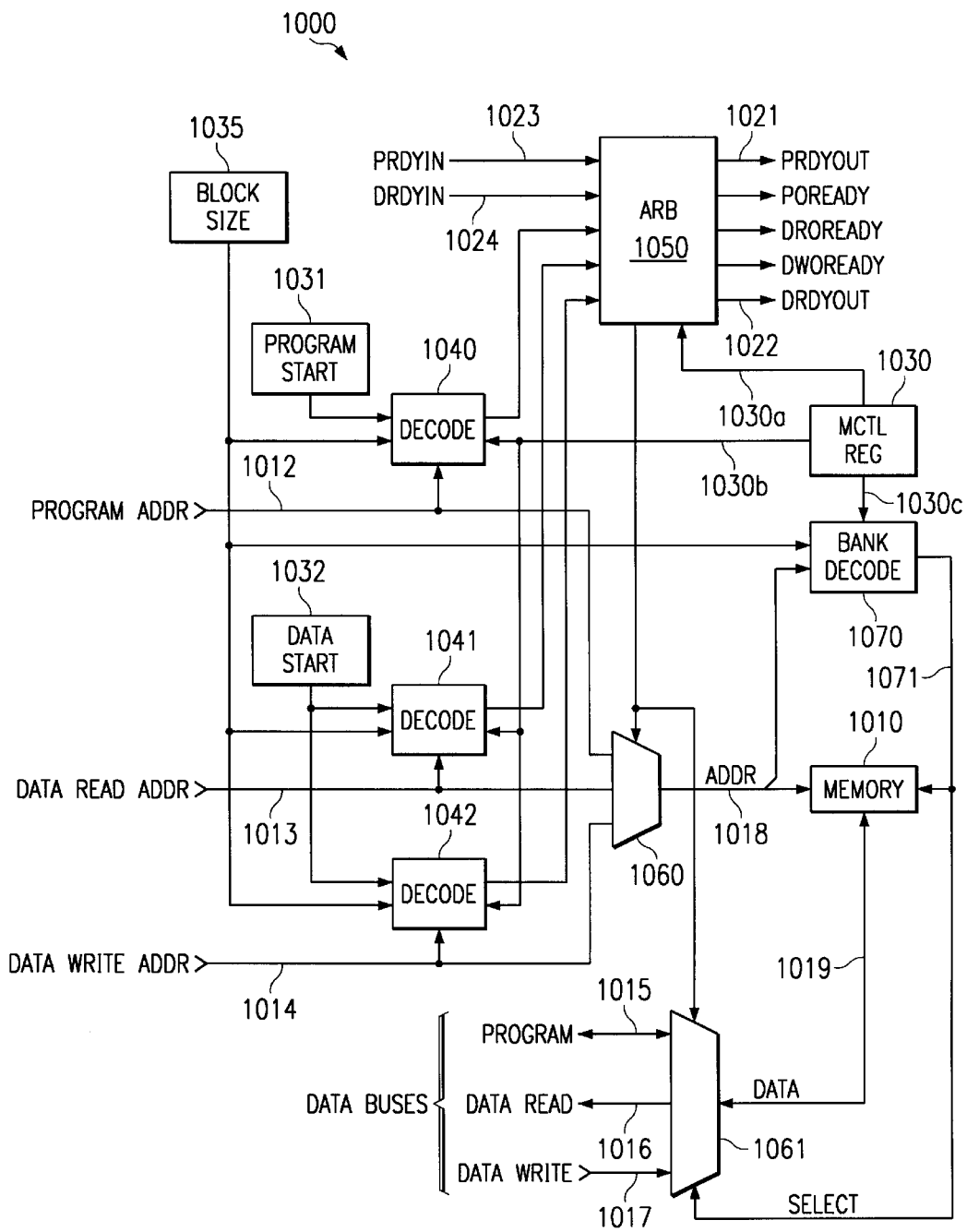
FIG. 10 is a block diagram illustrating a memory block representative of each of the replacement memory blocks of FIG. 3 in more detail.

FIG. 10 is a block diagram illustrating a memory block 1000 representative of each of the replacement memory blocks of FIG. 3 in more detail. Memory block 1000 has memory circuitry 1010 with a capacity of 4k×16 bits, for example. Each memory block is connected to program address and data bus 1012/1015, data read address and data bus 1013/1016 and data write address and data bus 1014/1017. Three wait state request signals; program space read ready POREADY, data space read ready DROREADY, and data space write ready DWOREADY; are generated by arbitration circuitry 1050 and connected to the CPU instruction pipeline control circuitry, as described earlier, for requesting wait states. A program ready output (PRDYOUT) signal 1021 and a data read ready output (DRDYOUT) signal 1022 are generated by arbitration circuitry 1050 and are daisy-chained to other memory blocks and ultimately connected to the CPU to indicate that a program word or a data word will be available at the end of the wait state period. A program ready input (PRDYIN) signal 1023 and a data read ready input (DRDYIN) signal 1024 are received by arbitration circuitry 1050 as part of the daisy-chain from other memory blocks. Wait state signals and ready signals are described in more detail with respect to FIGS. 11 and 12.

A memory control register 1030 as described with reference to FIG. 9 is included in each memory block 1000. A program start register 1031 and a data start register 1032 as described with reference to FIG. 8 is included within each memory block 1000. A block size register 1035 specifies the word capacity of memory circuitry 1010. Block size register 1035 is implemented as a read only fixed value when memory block 1000 is instantiated, but may be writable in another implementation.

A separate decode circuit 1040–42 is associated with each address bus 1012–15 and determines when an address presented on an address bus is within a range established by start address registers 1031 and 1032 and block size register 1035. Since up to three memory requests can be received on each of the three address buses 1012–15, an arbitration circuit 1050 determines which request will be serviced. Non-serviced requests are queued. A write request is highest priority as indicated in Table 1. An address multiplexor 1060 is connected to arbitration circuit 1050 and selects the highest priority address bus and connects it to a memory circuit address bus 1018. A data multiplexor 1061 is also connected to arbitration circuit 1050 and connects a memory circuit data bus 1019 to a respective data bus 1015–17 associated with the highest priority address bus. Once the highest priority request has been selected, a corresponding wait signal is asserted if a wait state is needed, as defined by wait state field 1030a of memory control register 1030. Also, either PRDYOUT signal 1021 or DRDYOUT signal 1022 is asserted in response to the selected request.

According to an aspect of the present invention, two memory blocks 1000 can be merged together by setting the merge bit in memory control register 1030. A merge signal 1030b is provided to each decoder circuit 1040–42, which causes the decoder to mask the high bit of the address block, as specified by block size register 1035. This bit is referred to herein as the relative most significant bit (msb), since it is the msb of the block of addresses, but not necessarily the msb of the complete address. Thus, both merged memory blocks respond to memory requests in an identical locked stepped manner to advantageously emulate a larger memory block. Otherwise, one memory block 1000 could respond to a program request, for example, while a second merged block 1000 responds to a data request, for example; this would not be a correct emulation of a large block of memory. In order for the correct memory circuit 1010 to respond to the selected memory request, a bank decoder 1070 compares the high bank signal 1030c from control register 1030 to the relative, msb address bit corresponding to the block size indicated by block size register 1035 to determine if a received address is within a preselected address bank indicated by the control register.

Thus, two memory blocks 1000 can be merged by appropriate setting of the control register and starting address registers and operate in lock step to simultaneously arbitrate and select a same one of several memory requests and to respond to the selected memory request by operating only one memory circuit 1010, as selected by a relative msb address bit.

Figure 11:
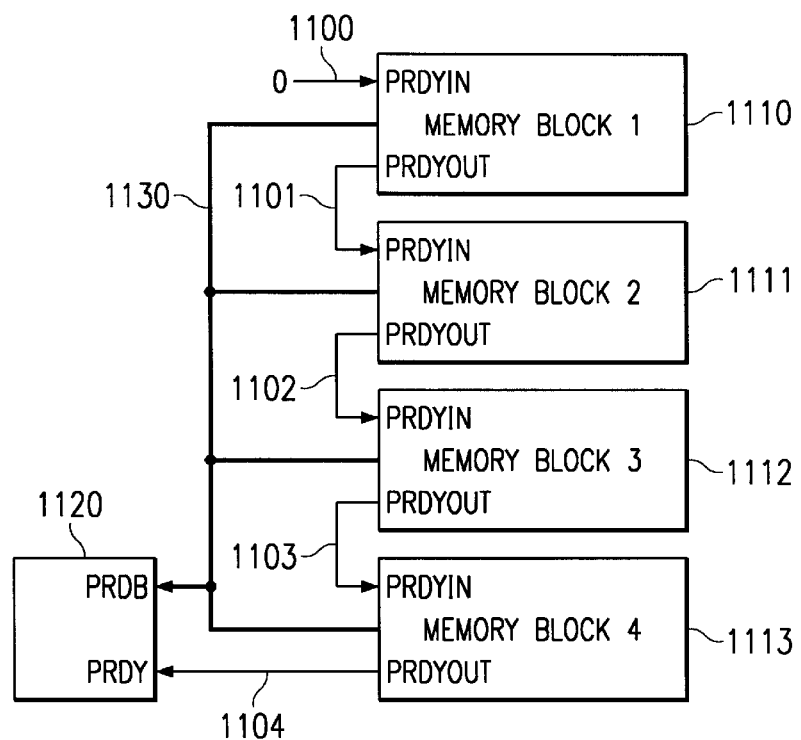
FIG. 11 is a block diagram of representative memory blocks of the emulation device which illustrates the program space ready daisy chain.

FIG. 11 is a block diagram of representative memory blocks which illustrates the program space ready daisy chain. As discussed above, each memory block is connected to both a program space ready (PRDY) daisy chain and to a data space ready (DRDY) daisy chain; however only the PRDY daisy chain is illustrated for simplicity. In FIG. 11, only four memory blocks 1110–14 are illustrated, for simplicity.

The PRDY and DRDY signals are defined as inputs to CPU core 1120 that indicate to the CPU that a memory is responding with valid data to a read request from the CPU. Since many memories and other components can be connected to the memory interface, the PRDY and DRDY signals must be driven active to the CPU every time a component is responding to a read request by having each component generate a PRDY or DRDY output and "ORing" all these before sending them to the CPU. For systems where multiple blocks of memory are present, the interfaces use a daisy-chain for the PRDY or DRDY signals. Every component has a PRDY/DRDY input and a PRDY/DRDY output. The PRDY daisy chain illustrated in FIG. 11 is formed by daisy chain signals 1100–1104, which are connected between the PRDYOUT signal and the PRDYIN; signal of sequential memory blocks. Initial daisy-chain signal 1100 is connected to logic 0 and final daisy chain signal 1104 is connected to the PRDY input on CPU core 1120. The output signal of any component goes active when either it is responding to a memory request or its input signal is active. Emulation device 6 and target device 10 have PRDY and DRDY daisy chains implemented in a similar manner.

Figure 12:
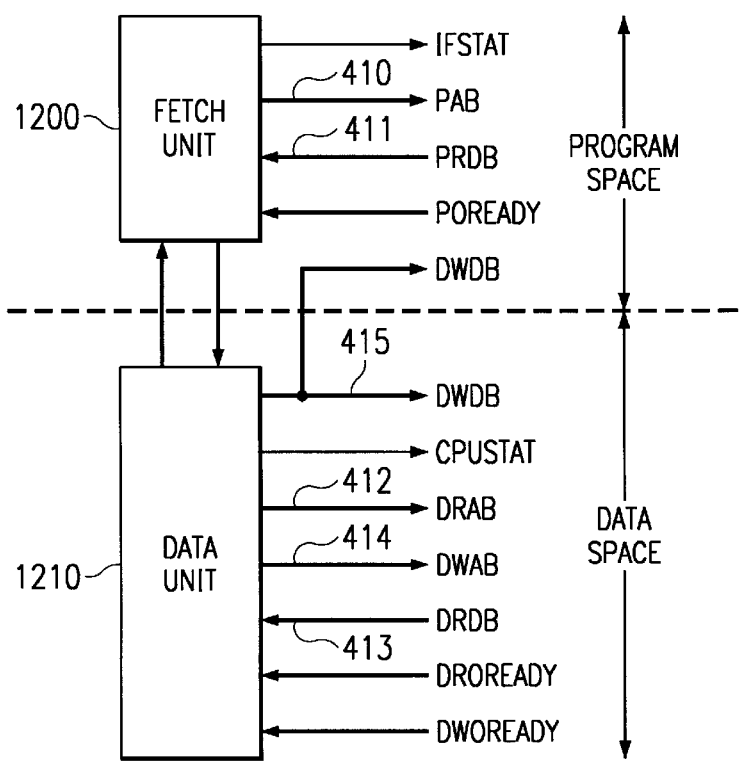
FIG. 12 is a block diagram of the instruction execution pipeline of CPU core of the emulation device, illustrating aspects of a decoupled fetch unit and various wait signals.

FIG. 12 is a block diagram of the instruction execution pipeline of CPU core 102 and 102a, illustrating aspects of decoupled fetch unit 1200 and the various wait signals. Decoupled fetch unit 1200 corresponds to prefetch stage 24 in FIG. 5, while data pipeline unit 1210 includes instruction pipeline read stage 30 and store stage 34 of FIG. 5. Decoupled fetch 1200 unit runs independently of pipeline unit 1210, allowing the fetch unit to continue issuing fetches while the data pipeline unit has stalled. The reverse is also true. The data pipeline can continue with its operations even if the fetch unit is stalled. The fetch unit uses a set of program space memory interface signals to perform instruction fetches and data accesses to program space. The fetch unit keeps the internal buffer full by prefetching instructions. The data pipeline works off the internal buffers and freezes the pipeline only when there are no instructions in the buffer. A memory can request wait states whenever it needs extra cycles to complete a request, as described with reference to FIG. 11. Even though the core has a two-staged pipelined read, the memory block must request wait states for a read at the first cycle where the read request is sent out by the CPU. The memory block cannot request a wait state when it is driving the data out on the second phase of the read. Therefore, timing of the wait signals is critical. For simplicity, not all of the memory interface signals are shown.

As described with respect to FIG. 10, wait signals POREADY, DROREADY, and DWOREADY are generated by arbitration circuitry in each memory block to send a request for additional wait states when the memory block cannot complete an operation within one cycle. All memories and components connected to the memory interface normally have the POREADY, DROREADY, and DWOREADY output held high. Only when a component recognizes that an access requires wait states does it pull the POREADY, DROREADY, and DWOREADY low.

Memory reads are pipelined in two stages. The CPU has two pipeline stages for all read operations. The core uses single-edge clocking; therefore, all core output signals are driven out on a clock edge and all input signals are sampled during a clock edge. At the start of a read cycle, address and strobes are asserted by the CPU. Memory blocks and other components decode the address and strobes to identify if the access is meant for that block. If the access is meant for that block and the block needs more cycles to complete the read operation, POREADY or DROREADY is pulled low before the next clock edge. This causes the CPU to freeze the pipeline (on data reads) and remain in this condition until the memory component that requested the wait state pulls the POREADY or DROREADY signal high again. On the cycle after POREADY or DROREADY goes high, the data is driven to the CPU along with PRDY or DRDY. The CPU latches the data at the next clock edge. In this embodiment, this timing relation is important and must be followed. POREADY or DROREADY must be asserted high exactly one cycle before the data and PRDY or DRDY is to be driven back to the CPU. One skilled in the art will recognize that another embodiment of the present invention may have different timing restrictions, or may dispense with the PRDY or DRDY signals altogether.

Program space writes use PAB 410 as the address bus, DWDB 415 as the data bus and PWDS0 and PWDS1 as the write-select strobes. Data space writes use DWAB 414 as the address bus, DWDB 415 as the data bus, and DWDS0 and DWDS1 as the write-select strobes. Address, data and write-select strobes are asserted by the CPU on a clock edge 1. If a data-space write requires wait states, the DWOREADY signal must be pulled low by the selected memory block before a clock edge 2. If the write completed successfully, DWOREADY goes high and the pipeline advances. Advantageously, by merging memory blocks and masking a msb of the address to the arbitration circuitry, generation of the wait signals proceeds as if each memory block was still independent so that critical timing of the wait signals is not compromised.

Fabrication of emulation device 6 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice, which may be sold as bare die or packaged. After packaging, finished parts are biased into an operational state and tested for operational functionality.

An alternative embodiment of the novel aspects of the present invention may include other circuitries, which are combined with the circuitries disclosed herein in order to reduce the total gate count of the combined functions. Since those skilled in the art are aware of techniques for gate minimization, the details of such an embodiment will not be described herein.

Thus, there has been described an emulation device for connecting to a target system in which variable size of memory can be configured to emulate customized blocks of memory in the target device.

Advantageously, blocks of memory in the emulation device can be linked together to form a single block of memory that operates in the same manner as a single block of memory. Arbitration circuitry in each block of memory operates in lock step by simply masking an address msb as an address is presented to the address decoders of the arbitration circuitry. By masking the msb address bit, each of the linked memory blocks responds to the address in the same manner, so that the linked memory blocks operate as a single memory block.

Advantageously, by masking an address bit in the arbitration circuitry, timing sensitive wait state signals from each linked memory block do not need to be interconnected.

In another embodiment, more than two memory blocks could be interconnected to form a single merged memory block.

In another embodiment, blocks of different size could be linked by providing suitable mapping circuitry.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system having an emulation device, wherein the emulation device comprises:

a plurality of the memory blocks; and a processor core connected to the plurality of memory blocks, such that the processor core is operable to execute instructions fetched from the plurality of memory blocks and to transfer data to the plurality of memory blocks each memory block comprising:

at least a first address bus input and a second address bus input coupled to the processor core for simultaneously receiving at least two addresses from the processor core;

a separate address decoding circuit connected to each one of the address bus inputs, each of the address decoding circuits operable to determine if a received address is assigned to the memory block;

arbitration circuitry coupled to the address decoding circuits operable to select the address of the highest priority type request;

memory circuitry coupled to the address buses, operable to transfer data on a selected one of two or more data buses in response to the selected address; and control circuitry connected to the address decoding circuitry operable to establish a linked mode and also an unlinked mode, such that in the unlinked mode the arbitration circuitry of a first one of the plurality of memory blocks is operable to select an address received on the first address bus and arbitration circuitry of a second one of the plurality of memory blocks is operable to simultaneously select an address received on the second address bus, but such that in the linked mode the arbitration circuitry of the first memory block and the second memory block both select a same address on only one of the address buses at a time.

2. The digital system of claim 1, wherein the emulation device further comprises an external interface connected to the processor core for connecting to an external target system, such that the digital system is operable to emulate the operation of a processor in the target system.

3. The digital system of claim 2, wherein the plurality of memory blocks are operable to be configured by the processor core to operate independently by not masking the relative msb of the received address or in a linked manner by masking the relative msb of the received address.

4. The digital system of claim 3, further comprising an emulator interface board having a JTAG interface connected to the emulation device and a breakpoint, tracing and timing port connected to the emulation device.

5. The digital system of claim 4, further comprising a test host connected to the emulator interface board.

6. A method for emulating a block of memory in a target system, comprising the steps of:

providing a plurality of emulation memory blocks that each can respond independently to different addresses provided on at least a first and second separate address buses by selecting one of the address buses;

operating a first one and a second one of the plurality of emulation memory blocks in an unlinked mode to emulate separate blocks of memory in a first target system, such that the first emulation memory block selects the first address bus to respond to while the second emulation memory block selects the second address bus to respond to in a parallel manner; and operating the first and second emulation memory blocks in a linked mode to emulate a single block of memory in a second target system by forcing the first and second emulation memory blocks to both select the first address bus for a first response and then both select the second address bus for a second response in a serial manner.

7. The method of claim 6, wherein the step of operating in a linked mode comprises the steps of:

masking a relative most significant bit (MSB) of an address received by the first and second emulation memory blocks on each of the first and second separate address buses, so that first and second emulation memory blocks both select the same address bus; and enabling either the first or second emulation memory block to respond to the selected address bus in response to the relative MSB.

8. The method of claim 6, wherein selecting one of the address buses comprises the steps of:

determining a first request type for an address provided on the first address bus and a second request type for an address provided on the second address bus; and selecting an address bus in response to a relative priority between the first request type and the second request type.

* * * * *